United States Patent
Rhoads

(10) Patent No.: US 8,429,205 B2
(45) Date of Patent: *Apr. 23, 2013

(54) ASSOCIATING DATA WITH MEDIA SIGNALS IN MEDIA SIGNAL SYSTEMS THROUGH AUXILIARY DATA STEGANOGRAPHICALLY EMBEDDED IN THE MEDIA SIGNALS

(75) Inventor: Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 1158 days.

This patent is subject to a terminal disclaimer.

(21) Appl. No.: 11/198,892

(22) Filed: Aug. 4, 2005

(65) Prior Publication Data

US 2006/0041591 A1 Feb. 23, 2006

Related U.S. Application Data

(63) Continuation-in-part of application No. 09/482,786, filed on Jan. 13, 2000, now Pat. No. 7,010,144, which (Continued)

(51) Int. Cl.
*G06F 7/00* (2006.01)
*G06F 17/30* (2006.01)
*G06F 17/00* (2006.01)

(52) U.S. Cl.
USPC .......................................... 707/809; 707/698

(58) Field of Classification Search .................. None
See application file for complete search history.

(56) References Cited

U.S. PATENT DOCUMENTS 4,230,990 A * 10/1980 Lert et al. ......................... 725/22
4,547,804 A 10/1985 Greenberg (Continued)

FOREIGN PATENT DOCUMENTS

EP 0493091 7/1992
EP 0581317 2/1994

(Continued)

OTHER PUBLICATIONS

"News On-Demand for Multimedia Networks" (Gene Miller, Greg Baber & Mark Gilliland; NYNEX, White Plains/NY/ Dow Jones, New York, NY; ACM 1993).*

(Continued)

*Primary Examiner* — Cheryl Lewis
*Assistant Examiner* — Raheem Hoffler

(57) ABSTRACT

A reference to auxiliary data is steganographically encoded within a media signal. The auxiliary data is stored in a metadata database that maps the reference encoded in the media signal to its corresponding metadata. Various application programs and devices can access the metadata by extracting the reference from the media signal, and querying the database for metadata corresponding to the reference. The metadata database may be implemented in a network server to make metadata readily available to devices and applications distributed throughout a network. This steganographic link to metadata may be used to retrieve metadata across media management systems. In one configuration, for example, media management systems have metadata servers that maintain metadata for a collection of media signals. The metadata server is responsible for responding to requests for metadata associated with media titles in its collection. In the event that a metadata server does not have metadata associated with a particular media title, it forwards the reference extracted from the media signal to a metadata router, which in turn, re-directs the request to the appropriate metadata server.

14 Claims, 3 Drawing Sheets

Related U.S. Application Data

(63) (is a continuation-in-part of application No. 08/746,613, filed on Nov. 12, 1996, now Pat. No. 6,122,403, which is a continuation-in-part of application No. 08/649,419, filed on May 16, 1996, now Pat. No. 5,862,260, and a continuation-in-part of application No. 08/508,083, filed on Jul. 27, 1995, now Pat. No. 5,841,978, and a continuation-in-part of application No. PCT/US96/06618, filed on May 7, 1996, application No. 11/198,892, which is a continuation-in-part of application No. 09/507,096, filed on Feb. 17, 2000, now abandoned, which is a continuation-in-part of application No. 09/503,881, filed on Feb. 14, 2000, now Pat. No. 6,614,914, and a continuation-in-part of application No. 09/482,786, filed on Jan. 13, 2000, now Pat. No. 7,010,144.

(56) References Cited

U.S. PATENT DOCUMENTS

| | | | |
|---|---|---|---|
| 4,856,066 | A * | 8/1989 | Lemelson ............... 704/275 |
| 5,210,820 | A | 5/1993 | Kenyon |
| 5,315,098 | A | 5/1994 | Tow |
| 5,450,490 | A | 9/1995 | Jensen et al. |
| 5,493,677 | A * | 2/1996 | Balogh et al. ............ 707/104.1 |
| 5,499,294 | A * | 3/1996 | Friedman ............... 713/179 |
| 5,563,946 | A * | 10/1996 | Cooper et al. ............ 705/56 |
| 5,577,266 | A | 11/1996 | Takahisa |
| 5,617,119 | A | 4/1997 | Briggs et al. |
| 5,629,980 | A | 5/1997 | Stefik |
| 5,646,997 | A | 7/1997 | Barton |
| 5,721,788 | A | 2/1998 | Powell et al. |
| 5,748,763 | A | 5/1998 | Rhoads |
| 5,774,452 | A | 6/1998 | Wolosewicz |
| 5,774,666 | A | 6/1998 | Portuesi |
| 5,822,436 | A | 10/1998 | Rhoads |
| 5,838,458 | A | 11/1998 | Tsai |
| 5,841,978 | A | 11/1998 | Rhoads |
| 5,850,481 | A | 12/1998 | Rhoads |
| 5,857,038 | A | 1/1999 | Owada et al. |
| 5,862,217 | A | 1/1999 | Steinberg et al. |
| 5,862,218 | A | 1/1999 | Steinberg et al. |
| 5,862,260 | A | 1/1999 | Rhoads |
| 5,907,793 | A | 5/1999 | Reams |
| 5,933,829 | A | 8/1999 | Durst, Jr. |
| 5,943,093 | A | 8/1999 | Anderson et al. |
| 5,943,422 | A * | 8/1999 | Van Wie et al. ........... 705/54 |
| 5,978,773 | A | 11/1999 | Hudetz et al. |
| 6,005,613 | A | 12/1999 | Endsley et al. |
| 6,005,936 | A | 12/1999 | Shimizu et al. |
| 6,005,972 | A | 12/1999 | Fredlund et al. |
| 6,006,039 | A | 12/1999 | Steinberg et al. |
| 6,035,341 | A * | 3/2000 | Nunally et al. ............ 709/253 |
| 6,064,737 | A | 5/2000 | Rhoads |
| 6,121,530 | A | 9/2000 | Sonoda |
| 6,122,403 | A | 9/2000 | Rhoads |
| 6,147,940 | A | 11/2000 | Yankowski |
| 6,167,395 | A | 12/2000 | Beck et al. |
| 6,177,956 | B1 | 1/2001 | Anderson et al. |
| 6,201,879 | B1 * | 3/2001 | Bender et al. ............ 382/100 |
| 6,229,924 | B1 | 5/2001 | Rhoads et al. |
| 6,233,684 | B1 | 5/2001 | Stefik |
| 6,236,971 | B1 | 5/2001 | Stefik |
| 6,243,480 | B1 | 6/2001 | Zhao et al. |
| 6,266,654 | B1 * | 7/2001 | Schull ............... 705/58 |
| 6,278,781 | B1 | 8/2001 | Rhoads |
| 6,286,036 | B1 | 9/2001 | Rhoads |
| 6,304,345 | B1 | 10/2001 | Patton et al. |
| 6,307,949 | B1 | 10/2001 | Rhoads |
| 6,311,214 | B1 | 10/2001 | Rhoads |
| 6,324,573 | B1 | 11/2001 | Rhoads |
| 6,351,815 | B1 | 2/2002 | Adams |
| 6,381,341 | B1 | 4/2002 | Rhoads |
| 6,385,329 | B1 | 5/2002 | Sharma et al. |
| 6,389,055 | B1 | 5/2002 | August |
| 6,408,082 | B1 | 6/2002 | Rhoads et al. |
| 6,408,331 | B1 | 6/2002 | Rhoads |
| 6,411,725 | B1 | 6/2002 | Rhoads |
| 6,421,070 | B1 | 7/2002 | Ramos et al. |
| 6,424,725 | B1 | 7/2002 | Rhoads et al. |
| 6,434,561 | B1 | 8/2002 | Durst, Jr. |
| 6,442,285 | B2 | 8/2002 | Rhoads et al. |
| 6,449,367 | B2 | 9/2002 | Van Wie |
| 6,505,160 | B1 | 1/2003 | Levy et al. |
| 6,516,079 | B1 | 2/2003 | Rhoads et al. |
| 6,522,770 | B1 | 2/2003 | Seder et al. |
| 6,535,617 | B1 | 3/2003 | Hannigan et al. |
| 6,542,927 | B2 | 4/2003 | Rhoads |
| 6,542,933 | B1 | 4/2003 | Durst, Jr. |
| 6,553,129 | B1 | 4/2003 | Rhoads |
| 6,567,533 | B1 | 5/2003 | Rhoads |
| 6,577,746 | B1 | 6/2003 | Evans et al. |
| 6,580,808 | B2 | 6/2003 | Rhoads |
| 6,590,996 | B1 | 7/2003 | Reed et al. |
| 6,590,998 | B2 | 7/2003 | Rhoads |
| 6,611,607 | B1 | 8/2003 | Davis et al. |
| 6,614,914 | B1 | 9/2003 | Rhoads et al. |
| 6,628,824 | B1 | 9/2003 | Belanger |
| 6,647,128 | B1 | 11/2003 | Rhoads |
| 6,647,130 | B2 | 11/2003 | Rhoads |
| 6,650,761 | B1 * | 11/2003 | Rodriguez et al. ............ 382/100 |
| 6,681,028 | B2 | 1/2004 | Rodriguez et al. |
| 6,681,029 | B1 | 1/2004 | Rhoads |
| 6,694,042 | B2 | 2/2004 | Seder et al. |
| 6,694,043 | B2 | 2/2004 | Seder et al. |
| 6,700,990 | B1 | 3/2004 | Rhoads |
| 6,700,995 | B2 | 3/2004 | Reed |
| 6,701,328 | B1 * | 3/2004 | Sakakibara et al. ............ 1/1 |
| 6,704,869 | B2 | 3/2004 | Rhoads et al. |
| 6,718,046 | B2 | 4/2004 | Reed et al. |
| 6,718,047 | B2 | 4/2004 | Rhoads |
| 6,721,440 | B2 | 4/2004 | Reed et al. |
| 6,760,463 | B2 | 7/2004 | Rhoads |
| 6,763,123 | B2 | 7/2004 | Reed et al. |
| 6,768,809 | B2 | 7/2004 | Rhoads et al. |
| 6,772,124 | B2 | 8/2004 | Hoffberg |
| 6,775,392 | B1 | 8/2004 | Rhoads |
| 6,782,115 | B2 | 8/2004 | Decker et al. |
| RE38,600 | E | 9/2004 | Mankovitz |
| 6,798,894 | B2 | 9/2004 | Rhoads |
| 6,807,285 | B1 | 10/2004 | Iwamura |
| 6,813,366 | B1 | 11/2004 | Rhoads |
| 6,829,368 | B2 | 12/2004 | Meyer et al. |
| 6,879,701 | B1 | 4/2005 | Rhoads |
| 6,917,724 | B2 | 7/2005 | Seder et al. |
| 6,920,232 | B2 | 7/2005 | Rhoads |
| 6,941,275 | B1 | 9/2005 | Swierczek |
| 6,947,571 | B1 | 9/2005 | Rhoads et al. |
| 6,965,682 | B1 | 11/2005 | Davis |
| 6,965,683 | B2 | 11/2005 | Hein, III |
| 6,965,873 | B1 | 11/2005 | Rhoads |
| 6,975,746 | B2 | 12/2005 | Davis et al. |
| 6,981,059 | B1 | 12/2005 | Philyaw et al. |
| 6,988,202 | B1 | 1/2006 | Rhoads et al. |
| 6,996,252 | B2 | 2/2006 | Reed et al. |
| 7,003,731 | B1 | 2/2006 | Rhoads et al. |
| 7,010,144 | B1 | 3/2006 | Davis et al. |
| 7,024,016 | B2 | 4/2006 | Rhoads et al. |
| 7,027,614 | B2 | 4/2006 | Reed |
| 7,035,427 | B2 | 4/2006 | Rhoads |
| 7,044,395 | B1 | 5/2006 | Davis et al. |
| 7,050,603 | B2 | 5/2006 | Rhoads |
| 7,051,086 | B2 | 5/2006 | Rhoads et al. |
| 7,054,465 | B2 | 5/2006 | Rhoads |
| 7,058,697 | B2 | 6/2006 | Rhoads |
| 7,062,069 | B2 | 6/2006 | Rhoads |
| 7,095,871 | B2 | 8/2006 | Jones et al. |
| 7,111,170 | B2 | 9/2006 | Rhoads et al. |
| 7,113,614 | B2 | 9/2006 | Rhoads |
| 7,139,408 | B2 | 11/2006 | Rhoads et al. |
| 7,158,654 | B2 | 1/2007 | Rhoads |
| 7,164,780 | B2 | 1/2007 | Brundage et al. |
| 7,171,016 | B1 | 1/2007 | Rhoads |

| | | | | | | |
|---|---|---|---|---|---|---|
| 7,171,018 | B2 | 1/2007 | Rhoads et al. | 2002/0051577 A1 | 5/2002 | Kinjo |
| 7,174,031 | B2 | 2/2007 | Rhoads et al. | 2002/0059162 A1 | 5/2002 | Shinoda et al. |
| 7,177,443 | B2 | 2/2007 | Rhoads | 2002/0072935 A1 | 6/2002 | Rowse et al. |
| 7,184,573 | B2 * | 2/2007 | Malone et al. ................ 382/100 | 2002/0131076 A1 | 9/2002 | Davis |
| 7,185,201 | B2 | 2/2007 | Rhoads et al. | 2002/0176003 A1 | 11/2002 | Seder et al. |
| 7,206,820 | B1 | 4/2007 | Rhoads et al. | 2002/0186886 A1 | 12/2002 | Rhoads |
| 7,209,571 | B2 | 4/2007 | Davis et al. | 2002/0196272 A1 | 12/2002 | Ramos et al. |
| 7,213,757 | B2 | 5/2007 | Jones et al. | 2003/0011684 A1 | 1/2003 | Narayanaswami et al. |
| 7,224,819 | B2 | 5/2007 | Levy et al. | 2003/0012403 A1 | 1/2003 | Rhoads et al. |
| 7,224,995 | B2 | 5/2007 | Rhoads | 2003/0021441 A1 | 1/2003 | Levy et al. |
| 7,248,717 | B2 | 7/2007 | Rhoads | 2003/0040326 A1 | 2/2003 | Levy et al. |
| 7,261,612 | B1 | 8/2007 | Hannigan et al. | 2003/0040957 A1 | 2/2003 | Rhoads et al. |
| 7,302,574 | B2 | 11/2007 | Conwell et al. | 2003/0083098 A1 | 5/2003 | Yamazaki et al. |
| 7,305,104 | B2 | 12/2007 | Carr et al. | 2003/0105730 A1 | 6/2003 | Davis et al. |
| 7,308,110 | B2 | 12/2007 | Rhoads | 2003/0123659 A1 | 7/2003 | Forstrom et al. |
| 7,308,485 | B2 | 12/2007 | Roberts | 2003/0130954 A1 | 7/2003 | Carr et al. |
| 7,313,251 | B2 | 12/2007 | Rhoads | 2003/0187798 A1 | 10/2003 | McKinley et al. |
| 7,319,775 | B2 | 1/2008 | Sharma et al. | 2004/0005093 A1 | 1/2004 | Rhoads |
| 7,330,564 | B2 | 2/2008 | Brundage et al. | 2004/0015362 A1 | 1/2004 | Rhoads |
| 7,333,957 | B2 | 2/2008 | Levy et al. | 2004/0015492 A1 * | 1/2004 | Fujita et al. ...................... 707/3 |
| 7,349,552 | B2 | 3/2008 | Levy et al. | 2004/0022444 A1 | 2/2004 | Rhoads |
| 7,362,781 | B2 | 4/2008 | Rhoads | 2004/0190750 A1 | 9/2004 | Rodriguez et al. |
| 7,369,678 | B2 | 5/2008 | Rhoads | 2004/0213458 A1 * | 10/2004 | Kanatsu ........................ 382/181 |
| 7,372,976 | B2 | 5/2008 | Rhoads et al. | 2004/0240704 A1 | 12/2004 | Reed |
| 7,377,421 | B2 | 5/2008 | Rhoads | 2004/0264733 A1 | 12/2004 | Rhoads et al. |
| 7,391,880 | B2 | 6/2008 | Reed et al. | 2005/0028189 A1 | 2/2005 | Heine et al. |
| 7,406,214 | B2 | 7/2008 | Rhoads et al. | 2005/0041835 A1 | 2/2005 | Reed et al. |
| 7,424,131 | B2 | 9/2008 | Alattar et al. | 2005/0058318 A1 | 3/2005 | Rhoads |
| 7,427,030 | B2 | 9/2008 | Jones et al. | 2005/0091268 A1 | 4/2005 | Meyer |
| 7,433,491 | B2 | 10/2008 | Rhoads | 2005/0192933 A1 | 9/2005 | Rhoads et al. |
| 7,437,430 | B2 | 10/2008 | Rhoads | 2006/0013435 A1 | 1/2006 | Rhoads |
| 7,444,000 | B2 | 10/2008 | Rhoads | 2006/0041591 A1 | 2/2006 | Rhoads |
| 7,444,392 | B2 | 10/2008 | Rhoads et al. | 2006/0136565 A1 | 6/2006 | Rhoads |
| 7,450,734 | B2 | 11/2008 | Rodriguez et al. | 2006/0174348 A1 | 8/2006 | Rhoads et al. |
| 7,460,726 | B2 | 12/2008 | Levy et al. | 2006/0251291 A1 | 11/2006 | Rhoads |
| 7,461,136 | B2 | 12/2008 | Rhoads | 2007/0055884 A1 | 3/2007 | Rhoads |
| 7,466,840 | B2 | 12/2008 | Rhoads | 2007/0108287 A1 | 5/2007 | Davis et al. |
| 7,486,799 | B2 | 2/2009 | Rhoads | 2007/0154064 A1 | 7/2007 | Rhoads et al. |
| 7,502,759 | B2 | 3/2009 | Hannigan et al. | 2007/0185840 A1 | 8/2007 | Rhoads |
| 7,505,605 | B2 | 3/2009 | Rhoads | 2007/0189533 A1 | 8/2007 | Rhoads |
| 7,508,955 | B2 | 3/2009 | Carr et al. | 2007/0276841 A1 | 11/2007 | Rhoads et al. |
| 7,515,733 | B2 | 4/2009 | Rhoads | 2007/0276928 A1 | 11/2007 | Rhoads et al. |
| 7,536,034 | B2 | 5/2009 | Rhoads et al. | 2008/0121728 A1 | 5/2008 | Rodriguez |
| 7,537,170 | B2 | 5/2009 | Reed et al. | 2008/0133555 A1 | 6/2008 | Rhoads et al. |
| 7,545,952 | B2 | 6/2009 | Brundage et al. | 2008/0292134 A1 | 11/2008 | Sharma et al. |
| 7,562,392 | B1 | 7/2009 | Rhoads | 2009/0012944 A1 | 1/2009 | Rodriguez et al. |
| 7,564,992 | B2 | 7/2009 | Rhoads | 2009/0116687 A1 | 5/2009 | Rhoads et al. |
| RE40,919 | E | 9/2009 | Rhoads | 2009/0125475 A1 | 5/2009 | Rhoads et al. |
| 7,590,259 | B2 | 9/2009 | Levy | 2009/0232352 A1 | 9/2009 | Carr et al. |
| 7,602,978 | B2 | 10/2009 | Levy et al. | 2009/0286572 A1 | 11/2009 | Rhoads et al. |
| 7,628,320 | B2 | 12/2009 | Rhoads | 2009/0290754 A1 | 11/2009 | Rhoads |
| 7,643,649 | B2 | 1/2010 | Davis et al. | 2010/0027837 A1 | 2/2010 | Levy et al. |
| 7,650,009 | B2 | 1/2010 | Rhoads | 2010/0045816 A1 | 2/2010 | Rhoads |
| 7,650,010 | B2 | 1/2010 | Levy et al. | 2010/0062819 A1 | 3/2010 | Hannigan et al. |
| 7,653,210 | B2 | 1/2010 | Rhoads | 2010/0094639 A1 | 4/2010 | Rhoads |
| 7,657,058 | B2 | 2/2010 | Sharma | 2010/0142749 A1 | 6/2010 | Rhoads et al. |
| 7,685,426 | B2 | 3/2010 | Ramos et al. | 2010/0172540 A1 | 7/2010 | Davis et al. |
| 7,693,300 | B2 | 4/2010 | Reed et al. | 2010/0198941 A1 | 8/2010 | Rhoads |
| 7,693,965 | B2 | 4/2010 | Rhoads | 2011/0007936 A1 | 1/2011 | Rhoads |
| 7,697,719 | B2 | 4/2010 | Rhoads | 2011/0026777 A1 | 2/2011 | Rhoads et al. |
| 7,711,143 | B2 | 5/2010 | Rhoads | 2011/0051998 A1 | 3/2011 | Rhoads |
| 7,738,673 | B2 | 6/2010 | Reed | | | |
| 7,747,038 | B2 | 6/2010 | Rhoads | | | |
| 7,751,588 | B2 | 7/2010 | Rhoads | | | |
| 7,751,596 | B2 | 7/2010 | Rhoads | | | |
| 7,756,290 | B2 | 7/2010 | Rhoads | | | |
| 7,760,905 | B2 | 7/2010 | Rhoads et al. | | | |
| 7,762,468 | B2 | 7/2010 | Reed et al. | | | |
| 7,787,653 | B2 | 8/2010 | Rhoads | | | |
| 7,792,325 | B2 | 9/2010 | Rhoads et al. | | | |
| 7,805,500 | B2 | 9/2010 | Rhoads | | | |
| 7,822,225 | B2 | 10/2010 | Alattar | | | |
| 7,837,094 | B2 | 11/2010 | Rhoads | | | |
| 2001/0026618 | A1 | 10/2001 | Van Wie | | | |
| 2001/0031066 | A1 | 10/2001 | Meyer et al. | | | |
| 2001/0034705 | A1 | 10/2001 | Rhoads et al. | | | |
| 2001/0055407 | A1 | 12/2001 | Rhoads | | | |
| 2002/0001395 | A1 | 1/2002 | Davis et al. | | | |
| 2002/0009208 | A1 | 1/2002 | Alattar et al. | | | |

FOREIGN PATENT DOCUMENTS

| | | |
|---|---|---|
| EP | 0642060 | 3/1995 |
| EP | 952728 | 10/1999 |
| EP | 1001604 | 5/2000 |
| EP | 1049320 B1 | 1/2003 |
| JP | 4-335480 | 11/1992 |
| JP | 5-037795 | 2/1993 |
| JP | 08-50598 | 2/1996 |
| JP | 3949679 | 7/2007 |
| WO | WO9400842 | 1/1994 |
| WO | WO9510813 | 4/1995 |
| WO | WO96/26494 | 8/1996 |
| WO | WO97/43736 | 11/1997 |
| WO | WO98/17052 | 4/1998 |
| WO | WO98/17059 | 4/1998 |
| WO | WO98/18258 | 4/1998 |
| WO | WO9904568 | 1/1999 |

| WO | WO99/14936 | 3/1999 |
| WO | WO00/33282 | 6/2000 |
| WO | WO00/36605 | 6/2000 |
| WO | WO00/39953 | 7/2000 |
| WO | WO00/39954 | 7/2000 |

OTHER PUBLICATIONS

"Steganography: its history and its application to computer based data files" (P. Davern & M. Scott; School of Computer Applications; Working Paper: CA-0795).*
U.S. Appl. No. 60/198,857, filed Apr. 21, 2000, Davis et al.
U.S. Appl. No. 09/507,096, filed Feb. 17, 2000, Davis et al.
Bassali et al., "Compression Tolerant Watermarking for Image Verification," IEEE Proc. Int. Conf. on Image Processing, vol. 1, Sep. 2000 pp. 434-437.
Epson Image Authentication System, Frequently Asked Questions, Oct. 5, 1999, 3 pages.
Friedman, "The Trustworthy Digital Camera: Restoring Credibility to the Photographic Image," IEEE Transactions on Consumer Electronics, vol. 39, No. 4, Nov. 1993, pp. 905-910.
Schneider et al., A Robust Content Based Digital Sig Proc. Int. Conf. on Image Processing, Sep. 16-19, 1996, Part vol. 3, pp. 227-230.
Toyokawa et al., "Secure Digital Photograph Handling with Watermarking Technique in Insurance Claim Process," Security and Watermarking of Multimedia Contents II, Proc. of SPIE, vol. 3971 (2000), pp. 438-445.
Walton, "Image Authentication for a Slippery New Age," Dr. Dobb's Journal, Apr. 1995, pp. 18-26, 82-87.
Zhao, "A WWW Service to Embed and Prove Digital Copyright Watermarks," In Proc. of the European Conf. on Multimedia Applications, Services and Techniques, Louvain-La-Neuve, Belgium, May 1996, 14 pages.
"The Power of Metadata Is Propelling Digital Imaging Beyond the Limitations of Conventional Photography" The Digital Imaging Group's DIG35 Initiative, Aug. 1999, 7 pages.
Wingfield, "FlashPoint Helps Beam Photos Onto the Web" Wall Street Journal, Dec. 23, 1999, 1 page.
Okon, "Keeping Up Multimedia Asset Value" Advanced Imaging, Jul. 1997, pp. 42-43.
"Coding of Still Pictures" ISO/IEC JTC 1/SC 29/WG 1 (ITU-T SG8), Digital Imaging Group, 9 pages.
"The Platform for the Future of Digital Imaging", Digita Technical Overview, FlashPoint Technology, Inc., Downloaded Jan. 13, 2000, 5 pages.
Matsutani, Mar. 17, 1995 "The Construction of Copyright-Protected Image Data" Technical Report of IEICE, ISEC94-58 [Mar. 1995].
Highwater FBI, 1995, Copyright Protection for Digital Images, Digital Fingerprinting from FBI Brochure, 4 pp.
Macq, Jun. 1995 Access Control and Copyright Protection for Images, Workpackage 1: Access Control and Copyright Protection for Images Needs Evaluation, RACE Project M1005 21 pages.
Quisquater, 1995, Access Control and Copyright Protection for Images, Conditional Access and Copyright Protection Based on the Use of Trusted Third Parties, 43 pages.
Macq, Jun. 1995, "Cryptology for Digital TV Broadcasting", Proc. Of the IEEE, Vo. 83, No. 6, pp. 944-957.
Bender, "Applications for Data Hiding", Jul. 1, 2000.
Tanaka, "Embedding the Attribute Information Into a Dithered Image Systems and Computers in Japan", Jan. 1, 1990, vol. 21, No. 7, pp. 43-50.
Sapwater, Electronic Copyright Protection PHOTO>Electronic Imaging, vol. 37, No. 6, pp. 16-21, Jan. 1, 1994.
Aura, "Practical Invisibility in Digital Communication", Proc. First Int. Workshop on Information Hiding, pp. 265-278, May 30, 1996.
Rekimoto, "The World through the Computer: Computer Augmented Interaction with Real World Environments," Symposium on User Interface Software and Technology, Nov. 14, 1995.
Final rejection mailed Feb. 23, 2004 in U.S. Appl. No. 09/482,786.
Appeal Brief dated Aug. 24, 2004 in U.S. Appl. No. 09/482,786.
U.S. Appl. No. 08/127,140, filed Sep. 27, 1993.
U.S. Appl. No. 09/343,104, filed Jun. 29, 1999, Tony F. Rodriguez, et al.
U.S. Appl. No. 09/343,101, filed Jun. 29, 1999, Bruce L. Davis, et al.
U.S. Appl. No. 09/413,117, filed Oct. 6, 1999, Geoffrey B. Rhoads.
U.S. Appl. No. 09/482,749, filed Jan. 13, 2000, Geoffrey B. Rhoads.
U.S. Appl. No. 09/507,096, filed Feb. 17, 2000, Geoffrey B. Rhoads, et al.
U.S. Appl. No. 09/538,493, filed Mar. 30, 2000, Geoffrey B. Rhoades.
U.S. Appl. No. 09/552,998, filed Apr. 19, 2000, Tony F. Rodriguez, et al.
U.S. Appl. No. 09/567,405, filed May 8, 2000, Geoffrey B. Rhoads, et al.
U.S. Appl. No. 09/629,649, filed Aug. 1, 2000, J. Scott Carr, et al.
U.S. Appl. No. 09/633,587, filed Aug. 7, 2000, Geoffrey B. Rhoads, et al.
U.S. Appl. No. 09/689,289, filed Oct. 11, 2000, Geoffrey B. Rhoads, et al.
U.S. Appl. No. 09/697,009, filed Oct. 25, 2000, Bruce L. Davis, et al.
U.S. Appl. No. 09/697,015, filed Oct. 25, 2000, Bruce L. Davis, et al.
U.S. Appl. No. 12/912,461, filed Oct. 26, 2010, Adnan M. Alattar.
U.S. Appl. No. 12/953,190, filed Nov. 23, 2010, Geoffrey B. Rhoads.
U.S. Appl. No. 13/084,981, filed Apr. 12, 2011, Geoffrey B. Rhoads.
Bender et al., "Techniques for data hiding," Proc. SPIE, vol. 2420, pp. 164-173, 1995.
Berners Lee, RFC1738, Uniform Resource Locators, Dec. 1994, 25 pages.
Mackay et al, "Video Mosaic: Laying Out Time in a Physical Space," Proc. of Multimedia '94, 8 pp.
Matsutani, "The Construction of Copyright-Protected Image Data Technical Report of IEICE," ISEC94-58, pp. 59-68, 1995. (This Matsutani document is erroneously cited as "Matsuya, 'Method of Composing Document and Image Data having Copyright Protection Function,' Report on Technical Study of the Institute of Electronics, Information and Communication Engineers, ISEC94-58, Mar. 17, 1995, pp. 59-68" on p. 3 of the below cited Mar. 24, 2006 Notice of Reason(s) for Rejection in the JP 2004-224727 application.).
Mar. 31, 2008 Notice of Allowance (including Examiner's search history), and Feb. 21, 2008 Amendment, each from assignee's U.S. Appl. No. 11/265,544 (published as US 2006-0136565 Al).
Sep. 28, 2001 Examination Report from the European Paten Office; Feb. 6, 2002 Response thereto; May 9, 2000 European Search Report; and claims as originally filed, each from assignee's European patent application No. 00116604.0—now EP 1049320 Bl.
Allowed Claims from assignee's Japanese patent application No. 2004-224727 (published as JP 3949679); and Mar. 24, 2006 Notice of Reason(s) for Rejection (English Translation) in the JP 2004-224727 application.
Kageyama et al, Melody Retrieval with Humming, Proceedings of Int. Computer Music Conference (ICMC), 1993, 3 pages.
Wagner, Fingerprinting, IEEE Proc. Symp. On Security and Privacy, pp. 18-22, 1983.
Wold et al, Content-Based Classification, Search, and Retrieval of Audio, IEEE Multimedia Magazine, Fall, 1996, 10 pages.
Johnson, et al., "Bridging the Paper and Electronic Worlds: The Paper User Interface", Interchi '93, pp. 507-512, Apr. 1993.
Whittaker, et al., "Back to the Future: Pen and Paper Technology Supports Complex Group Coordination," CHI '95, Conference on Human Factors in Computing Systems, Denver, Colorado (May 7-11, 1995) (text copy obtained from ACM), 12 pages.
Peairs, "Iconic Paper," Proceedings of the Third International Conference on Document Analysis and Recognition (ICDAR '95), pp. 1174-1179, 1995.
Newman, William, et al. "A Desk Supporting Computer-Based Interaction with paper Documents," ACM Conference on Human Factors in Computing Systems (CHI '92) May 3-7, 1992, pp. 587-592.
Rao, et al., "Protofoil: Storing and Finding the Information Worker's Paper Documents in an Electronic File Cabinet," Human Factors in Computing Systems (CHI '94), pp. 180-186, Boston, MA, Apr. 1994.
Zhao, et al., "Embedding Robust Labels into Images for Copyright Protection," Proceedings of International Congress on Intellectual Property Rights for Specialized Information, Knowledge and New Technology, Aug. 21, 1995, 10 pages.

Nov. 18, 2005 Communication and Sep. 18, 2000 Communication, each from the European Patent Office in Assignee's European Application No. 97924752.5. (EP counterpart of WO9743736, previously cited).

May 26, 2006 Response to the Nov. 18, 2005 Communication from the EPO in Assignee's European Patent Application No. 97924752.5 (allowed). (EP counterpart of WO9743736, previously cited).

Jun. 1, 2007 Summons to attend oral proceedings, and Dec. 20, 2007 Response thereto, from the European Patent Office in Assignee's European Patent Application No. 97924 752.5 (allowed). (EP counterpart of WO9743736, previously cited).

U.S. Appl. No. 09/574,726 Final Rejection mailed Apr. 15, 2008, Response filed Jul. 15, 2008 and Notice of Panel Decision mailed Aug. 1, 2008.

U.S. Appl. No. 09/636,102 Amendment filed Jun. 22, 2007 and Final Rejection mailed Jul. 18, 2008.

U.S. Appl. No. 10/090,775 Notice of Allowance mailed Jun. 6, 2008, Appeal Brief filed May 3, 2007 and Final Rejection mailed Aug. 4, 2006.

U.S. Appl. No. 09/531,076 Office Action mailed Jan. 25, 2008, Amendment dated Apr. 25, 2008, and Final Rejection mailed Aug. 6, 2008.

Extended European Search Report for EP Application 1018188.9, mailed May 2, 2011.

Davidson, Lloyd et al., "Digital Object Identifiers and Their Role in the Implementation of Electronic Publishing," IEEE, Apr. 23, 1998, pp. 59-65.

* cited by examiner

ASSOCIATING DATA WITH MEDIA SIGNALS IN MEDIA SIGNAL SYSTEMS THROUGH AUXILIARY DATA STEGANOGRAPHICALLY EMBEDDED IN THE MEDIA SIGNALS

RELATED APPLICATION DATA

This application is a continuation in part of U.S. patent application Ser. No, 09/482,786 (now U,S. Pat. No. 7,010.144), filed Jan. 13, 2000, which is a continuation in part of Ser. No. 08/746,613, filed Nov. 12, 1996 (now U.S. Pat. No. 6,122,403), which is a continuation in part of Ser. No. 08/649,419, filed May 16, 1996 (now U.S. Pat. No. 5,862,260), Ser. No. 08/508,083, filed Jul. 27, 1995 (now U.S. Pat. No. 5,841,978), and PCT application PCT/US96/06618, filed May 7, 1996 (Publication WO96/36163), which are hereby incorporated by reference.

This patent application is a continuation in part of U.S. patent application Ser. No. 09/507,096, filed Feb. 17, 2000 (now abandoned), which is a continuation in part of Ser. No. 09/503,881, filed Feb. 14, 2000 (now U.S. Pat. No. 6,614,914), and a continuation in part of Ser. No. 09/482,786, filed Jan. 13, 2000 now U.S. Pat. No. 7,010,144, which are hereby incorporated by reference.

FIELD OF THE INVENTION

The invention relates to still and moving image capture devices, and more particularly relates to associating auxiliary data with images captured in such devices.

BACKGROUND AND SUMMARY OF THE INVENTION

Prior art still image and movie cameras memorialized image data on media (e.g., film or magnetic tape), but did not include provision to store other useful information.

Some years ago, still-image cameras with the capability to insert visible date text in a corner of the image frame became available, solving the problem of trying to recall the dates that photos of interest were taken.

More recently, the Advanced Photo System provided a magnetic encoding medium on the back of photographic film, permitting additional information to be stored (e.g., exposure information, whether flash was used, desired print size, etc.).

With the growing popularity of digital storage of multimedia data, it would be helpful if auxiliary data could be stored in association with the multimedia data. Such storage is now possible in the header fields of certain popular data formats, but such data can be lost if the file is converted to another format.

In one embodiment of the invention, auxiliary data about a media signal is steganographically encoded ("watermarked") within the media signal itself. By integrating the media signal and the associated data in this fashion, the auxiliary data cannot become separated from the media signal. A great number of useful systems are thereby reliably enabled.

In another embodiment, a reference to auxiliary data is steganographically encoded within the media signal. The auxiliary data is stored in a metadata database that maps the reference encoded in the media signal to its corresponding metadata. Various application programs and devices can access the metadata by extracting the reference from the media signal, and querying the database for metadata corresponding to the reference. The metadata database may be implemented in a network server to make metadata readily available to devices and applications distributed throughout a computer network.

The steganographic link may be used to retrieve metadata across media management systems. In one configuration, for example, media management systems have metadata servers that maintain metadata for a collection of media signals. The metadata server is responsible for responding to requests for metadata associated with media titles in its collection. In the event that a metadata server does not have metadata associated with a particular media title, it forwards the reference extracted from the media signal to a metadata router, which in turn, re-directs the request to the appropriate metadata server.

The steganographic data may be embedded in a media signal within a media signal capture device, or elsewhere. In one embodiment, the steganographic data is embedded in the media signal as part of the process of uploading it to a network. In another embodiment, a capture device embeds steganographic data in the media signal before uploading it to an external device.

The foregoing and additional features and advantages will be more readily apparent from the following detailed description, which proceeds with reference to the accompanying drawings.

DETAILED DESCRIPTION

Introduction

Figure 1:
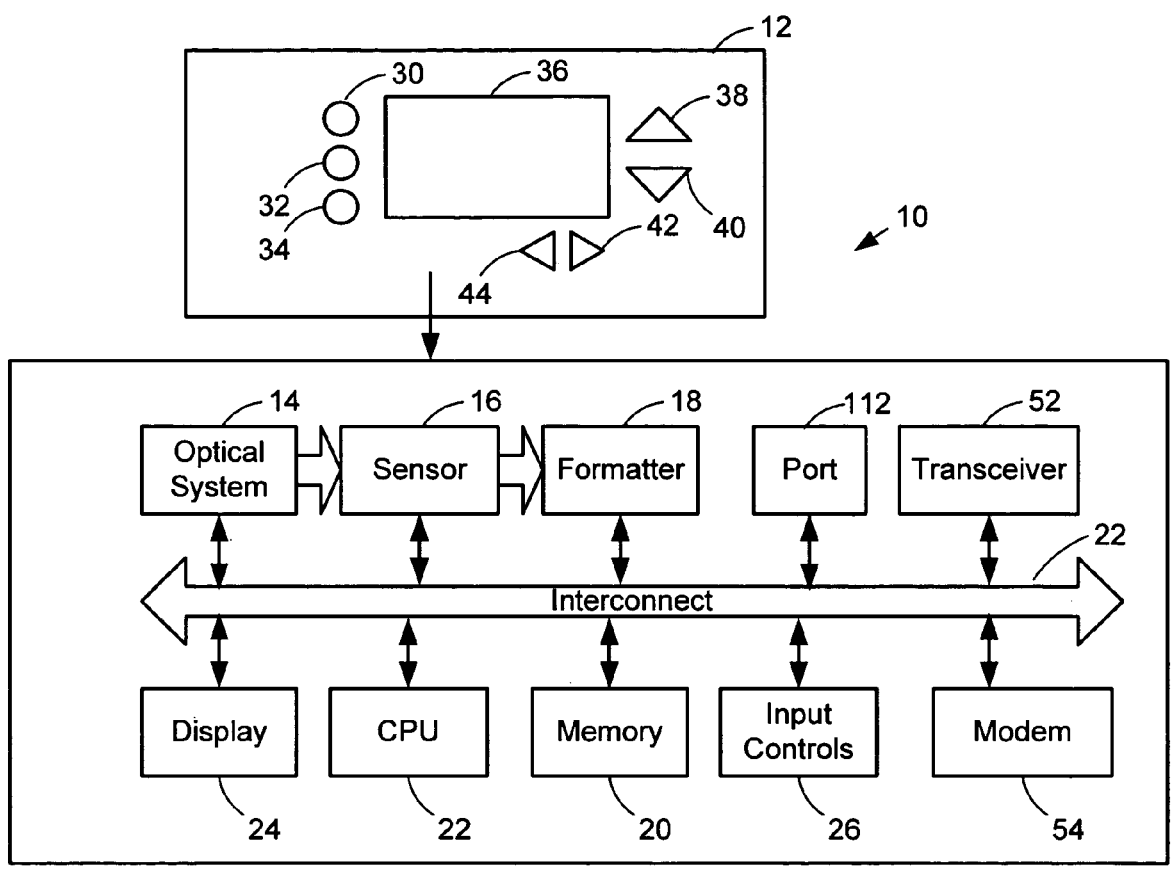
FIG. 1 is a block diagram illustrating an example of a digital camera.

As noted above, there are many applications for associating auxiliary data with images captured in an image capture device. A short list of these applications include:

managing copyrights,
authenticating images,
describing objects within an image,
describing the context of the image (time, place, subject, camera properties),
facilitating image searching based on content,
uploading and organizing images from cameras in photo library databases,
sharing images over networks, such as the Internet
linking derivative images to originals.

The following sections describe various implementations of image capture devices and related systems that associate various forms of data with images. The sections discuss associating data in images using steganographic and other techniques. Steganographic methods can encode data in an image, including identifiers and references that associate the image with additional data stored outside the image itself. In some applications, the capacity of the images to hold a steganographic signal, such as an imperceptible watermark, is sufficient to store the data associated with the image. In other applications, it is useful to store additional data elsewhere, and refer to it through a reference hidden in the image.

One way to associate data with an image is to store the data in the image container (e.g., a file), but outside the image. Yet another way is store the data in a location external to the image file, and create an association between the image file and the external data. In this case, the image may be associated with the external data via a reference encoded in the image itself or in the image file that refers to the external data. Data associated with a digital object, such as an image, is sometimes referred to as "metadata."

In some applications, the image capture device enables users to specify the types of data as well as specific items of data to be associated with images captured in it. The data "type" describes what a data item represents, while the data "item" refers to the actual data associated with the image. Some examples of data types include the time, place, and subject of the image, and examples of corresponding data items include: 12:30 PM, Times Square, Mom (corresponding to data types of time, place and subject).

The user may specify the data types through the user interface of the image capture device, or through the user interface of an external device or system, which in turn, communicates the desired data types to the image capture device. Camera user interface components, such as buttons or voice recognition modules, enable the user to change settings of the device anywhere, without the need to link it to external device. Data entry and device configuration through external devices, such as a personal computer, personal digital assistant or phone, provides a number of advantages, including remote control of the camera, access to more user friendly user interfaces, and more powerful data manipulation and storage than is capable on the camera.

In addition to specifying the data type, the user may also specify actual data items to be associated with images. Again, the user may specify the data items through the user interface of the image capture device, or through the user interface of an external device. In cases where the user supplies data items to the external device, these items may be downloaded to a storage device on the image capture device, associated with images at the time of or after image capture, and later transferred from the device along with the associated images to external storage. Alternatively, the data items may be kept in storage external to the image capture device and associated with selected images by reference, such as through an identifier that matches an identifier hidden in the image. For example, the camera or some other image management system can insert a steganographic link (e.g., in an image watermark) that associates the image with the desired data items.

Image Capture Devices and Connectivity to External Devices and Systems

The methods and systems for associating data with images can be implemented in many different types of image capture devices, including conventional film cameras, digital cameras and scanners. To simplify the discussion, the following description uses digital cameras as an example of one type of image capture device.

Digital Cameras

The design of digital cameras is well understood to those skilled in the art, so is not belabored here. FIG. 1 shows an example of a camera 10, including its user interface 12 and its internal architecture.

The camera 10 includes an optical system 14, an image sensor 16, and an image formatter 18. The optical system contains the camera's lens, focus control, and other optics components that control the transfer of light to the camera's sensor 16. The sensor is comprised of an array of discrete sensor elements arranged in clusters sensitive to three primary colors (e.g., red, green, blue). Two common types of sensors are CCD and CMOS sensors. The image formatter includes an analog to digital converter to convert signals from the sensor elements to digital form. It also includes a color space converter to map the signal into a desired color space, such as RGB or YUV. The formatter transforms the image signal into a form suitable for further processing and storage and stores it in the camera's memory subsystem.

Because the specific interconnect varies with the implementation, FIG. 1 depicts a general interconnect 22 that represents the data and control path among various components in the camera. In addition to the image capture components described above, the camera includes a processing unit 22, a memory subsystem 20, and various I/O devices. The camera may include one or more processing devices, such as a microprocessor, and a DSP.

The processing unit executes an operating system, such as VxWorks real time embedded operating system in the Digita Operating Environment from Flashpoint, Inc., or Windows CE from Microsoft Corporation. Application programs supporting functions described throughout this document may be developed using software development environments designed for these and other commercially available operating systems, such as Tornado Tools from Wind River.

A steganographic embedder may be implemented as an application program that executes on the processing unit, or in special purpose hardware that has access to the memory subsystem.

The memory subsystem 20 includes a combination of ROM, RAM, and removable storage devices such as a flash memory card.

The I/O devices include a display 24, and input controls 26. The upper portion of FIG. 1 depicts an example of the rear panel of the camera showing user interface components on the camera. The panel has buttons and switches 30, 32, 34 that control operating modes of the camera and display modes on the display screen 36. It also includes scroll buttons 38-44 that enable the user to scroll through options on various display screens.

The camera is equipped with one or more external interfaces to transfer images, image related data, and operating parameters to and from external devices. The type and number of interfaces for external connectivity vary from camera to camera, and include:

ports 50 for wire connections to external devices such as serial ports, USB ports, parallel ports, PCI, Firewire or Ilink ports (IEEE 1394 and USB2 ports), and transceivers and receivers 52 for wireless connections such as an infrared transceiver, RF transceivers, FM receivers, etc.

The camera may also include a cellular or conventional modem 54 for transferring data to and from a telephone network. In addition to transferring images and data via connections to external devices, the camera can also receive and send data via a removable memory device.

Connectivity to External Devices

The camera's connectivity features enable it to upload images and data to external devices, and enables external devices to download operating parameters and image related data (e.g., image metadata). There are numerous connectivity configurations, including wired and wireless connections to stand-alone and networked devices.

Figure 2:
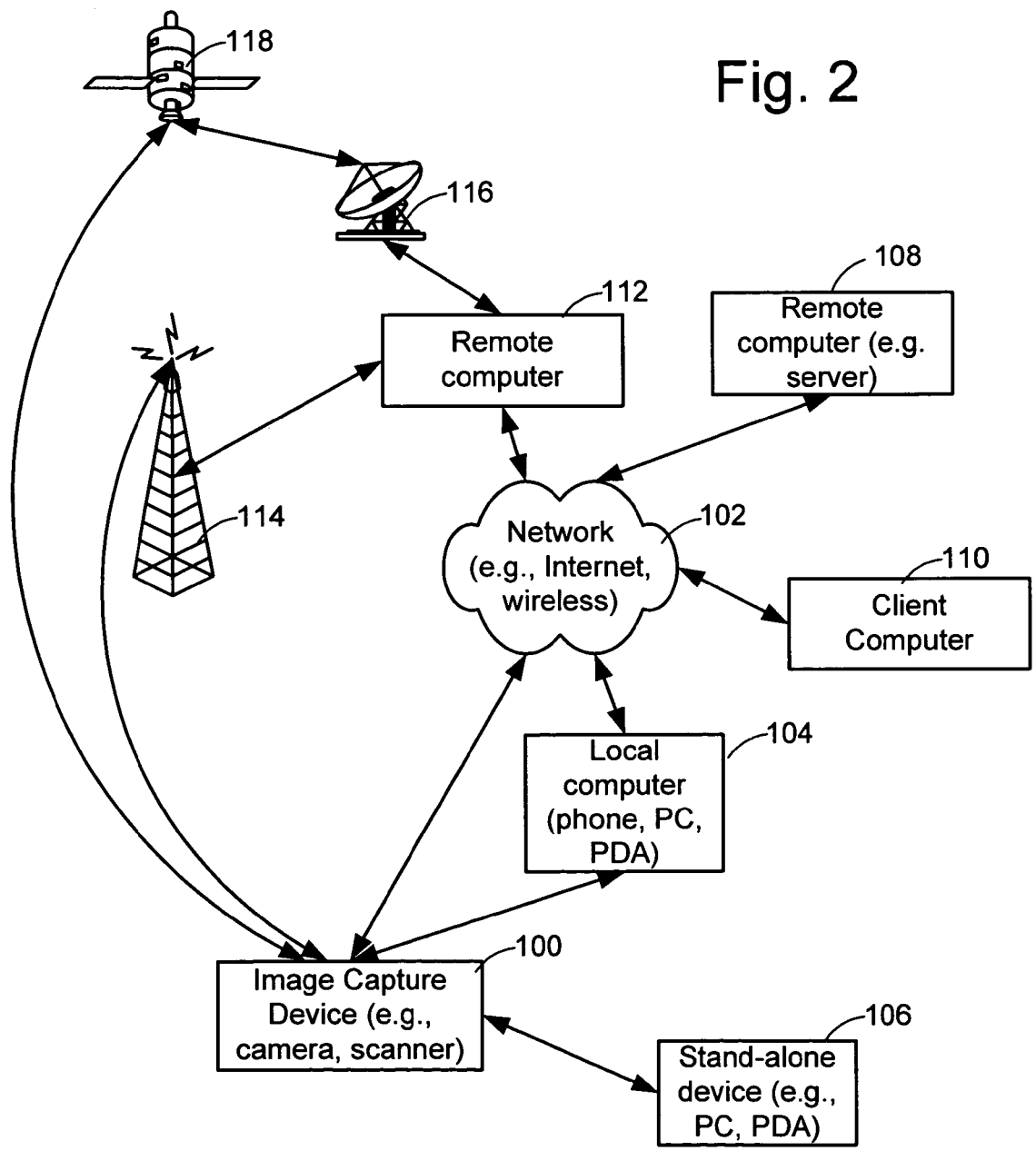
FIG. 2 is a block diagram illustrating various connectivity configurations for transferring data to and from an image capture device.

FIG. 2 is diagram illustrating some examples of configurations for connecting the camera with external devices. As shown, the camera 100 may connect directly to a communication network 102, like the Internet, it may connect to a networked device such as a personal computer or telephone (104), and finally, it may connect to a stand-alone device 106.

In order to connect to a network, the camera may have a cellular or conventional modem or a network adapter. It may be connected to a networked or stand-alone device via a communication interface such as the ones mentioned in the previous section.

FIG. 2 highlights some of the connectivity scenarios made possible by these connectivity components in the camera. The connectivity scenarios can be grouped into two principle categories: 1) transferring data and operating parameters to the camera; and 2) uploading images, data associated with the images, and operating parameters from the camera.

Transfers to the Camera

One configuration is to transfer the desired information through a direct connection to the camera, such as through the camera's serial port, USB port, parallel port, Firewire or Ilink port, infrared transceiver port, or RF transceivers port. In this scenario, the source of the information may be a networked or stand-alone device.

Another configuration is through an indirect connection from the source of the information to the camera. The indirect connection may include one or more hops through a wired or wireless connection. An example of a wired connection is where the camera 100 is connected to a network 102, such as the Internet, and another device, such as a server 108, sends the information through the network to the camera, which is connected to the network. A useful application of this configuration is where a user of a client computer 110 designates operating parameters and metadata through an interactive web site. The web server 108, in turn, transfers the operating parameters and metadata to the camera through the network 102.

Another related configuration is where a user specifies desired parameters to a server computer 112, which in turn, sends the data to the camera through a wireless connection or broadcast. One example of a wireless connection is through wireless network to a cellular modem in the camera. Example of a wireless broadcast include transmitting the data from the server to a FM transmitter (e.g., the radio tower 114) or satellite transmitter (116, 118) to a compatible receiver in the camera.

Uploading Data from the Camera

Many of the same configurations outlined above for transferring data to the camera apply to uploading data from the camera as well. However, as practical matter, cameras have more limited resources to process and transmit data. One way to address these limitations is to incorporate into the camera a high bandwidth interface to transfer large amounts of data, such as the images and their related metadata, as well as a low bandwidth interface for transferring smaller packages of data, such as an identifier or set of control signals. The high bandwidth interface may be implemented using a port that can communicate large amounts of data efficiently, without unduly complicating the circuitry on the camera. Examples of such ports include a USB, firewire or Ilink port (IEEE 1394 and USB2). The low bandwidth interface may be used to implement a wireless signal transmitter, such as cellular modem transceiver, or other wireless signal transmitter, such as FM, RF, infrared, etc.

Image Data Configuration

As noted above, there are two principle categories of methods for configuring the camera to specify its operating parameters, and to specify the types of auxiliary data to be associated with images: 1) through the user interface of the camera; and 2) through an external device. The following sections provide examples of devices for configuring the camera and methods of operating these devices.

Camera UI

The camera UI may be implemented with many different combinations of input and output devices. The input devices may be implemented using combinations of hardware controls, such as buttons, switches, dials, cursor control devices, etc., and soft controls, such as touch screens, soft buttons, scroll bars, and check boxes displayed on a display device. The camera may also be configured to receive voice input through a microphone, voice codec, and voice recognition hardware and software.

Similarly, the output devices may produce visual and/or audio output. For example, the camera may have a display screen, with or without support for video output. In addition, it may have audio output, and allow for playback of voice instructions, and output of a text to speech synthesis system.

In the example depicted in FIG. 1, the user manipulates the user interface (FIG. 1) to specify the data that is to be associated with a picture or series of pictures. The user may specify the data type to be associated with a picture, and then allow the camera to supply the actual data from its storage or from an internal device (e.g., clock for the time, GPS for the location, etc.). The data in the storage device may, for example, be downloaded to the camera from an external source. Additionally, the user may specify the actual data to be associated with each picture, either in advance, or as he snaps the pictures. For example, the photographer might enter his name, and the names of the people or things in the picture. The photographer may opt to enter the data once, and then have it linked to several pictures in a virtual roll. A virtual roll is a set of images that constitutes a "roll."

In one particular implementation depicted in FIG. 1, the user interface accepts user input via the buttons 30-34. Using known UI techniques, the user can use the scroll buttons 38-44) to scroll through a list of selections displayed on display screen 36 until a desired selection is presented. Once the list has been scrolled to the desired entry, the user can actuate a second button (e.g., 32-34) to effect that selection. The data types associated with an image or set of images can be of various classes. One class can identify the photographer, another class can identify the subject, etc.

For the class of photographers, the scrollable list of selections can include a default list of descriptors (e.g., Mom, Dad, Child1, Child2, #1, #2, etc.), supplemented (or replaced if desired) by a list that is customized by the owner of the camera (e.g., Bill, Kristen, Hannah, David, etc.).

The class of subjects can similarly include a default list (e.g., Birthday, Vacation, Anniversary, Wedding, House, Car, Pet, etc.) and/or a customized list (Uncle Harry, Yellowstone, Mushrooms, Seascapes, etc.) The user interface for selection of subjects may permit selection of several subjects—providing alternate descriptors for an image. A descriptor selected by the user can be used to encode the picture just-snapped, or can be used to encode pictures thereafter-snapped. A descriptor embedded in the image may be in the form of text, or a number that refers to metadata stored outside the image.

Rather than having a cumbersome interface built into the camera, the camera may support one or more plug-in user interface peripherals, such as a keyboard. Alternatively, the configuration data in the camera may be synchronized with configuration data in an external device via a wire or wireless connection.

In some applications, the photographer may be intentionally precluded from controlling the data associated with pictures. This feature is important in applications where there is concern that the photographer might tamper with the metadata associated with an image. For example, the photographer might try to alter the time, place or subject to create a false or misleading photographic record. To prevent such tampering, the photographer's employer or supervisor can set the operating parameters and make data type selections from an external source. Operating parameters may be used to set certain types of data, such as the time, or to disable the photographer's ability to change certain parameters.

In order to implement such features, the camera supports a variety of different operating modes. In a session mode, the camera operates under the control of parameters that govern that session. The operating parameters for the session may be established through the user interface of the camera, or from an external device. In addition, the user may initiate a session, or an external device may initiate the session.

When the camera receives the operating parameters for the session, it makes all settings to comply with the instructions specified in the operating parameters. For example, if the session parameters instruct the camera to set the time, date, place or subject for the session, the camera does so. The session parameters may also specify that the user is to be precluded from altering the operating parameters for the duration of the session. For example, the user may be precluded from altering data items or data types associated with images snapped during the session or from altering certain camera functions, such as a time keeping function, a GPS function, etc. during the session.

The duration of the session may be set and measured using certain operating parameters. For example, the session may be in effect for specified period of time, for selected number of images, for selected GPS locations within a defined range, etc. In addition, the session duration may be specified in terms of certain events, such as a configuration event in which the session is configured, and an upload event, where the images snapped during a session are uploaded from the camera. Using this approach, the one configuring the camera can specify that the session shall extend from the configuration event to some other event, such as the act of uploading the images in the session.

The camera can be programmed to operate according to the parameters that govern the session. It may disallow the user from capturing images when the camera travels outside a particular location specified in the session parameters and monitored by the GPS unit within the device. Similarly, it may disallow the user from capturing images outside a predetermined time interval specified in the session parameters. To this end, the camera has a time clock that keeps time and is synchronized to a master clock to avoid errors that might occur due to user tampering or traveling through different time zones. The time clock can be set permanently to run synchronized with a master clock or can be periodically synchronized by an external master clock via a wire or wireless connection. Just as the parameters can prevent certain actions outside a given time span or geographic area, they can also selectively allow certain actions within a given time span or area. In addition, the time clock and GPS unit can be used to insert or link a time and place stamp to every image that is captured during a session or otherwise.

The session parameters can govern when and where the images are steganographically marked and uploaded. For example, the parameters may specify that the images are to be steganographically marked at the time of image capture, or at some later time. Similarly, the parameters may specify that the images are to be steganographically marked at the location of image capture or some other location (within some geographic region), as determined by the GPS unit within the device. Similar parameters may be established to specify a time or time range for when the image or images may be uploaded to an external storage device or processor.

A session may be tracked and associated with session related metadata by a session identifier encoded in the image, the image file, or its metadata. For example, the session identifier may be a number or message embedded steganographically in the image or metadata associated with the image.

Configuration via External Devices

As noted in previous sections, the data to be associated with images may be provided by an external device. The external device may set operating parameters that control the operation of the camera, including how and what data it associates with images. The external device may also set the data types as well as the actual data to be associated with images in the camera.

In some applications, a computer can be programmed to perform this function automatically for one or more cameras. For example, a server may be programmed to broadcast operating parameters and data to several cameras in the field.

In other applications, a user may enter the desired operating parameters and data to be associated with the images in the camera. In client-server scenario, for example, a user of a client device may submit desired operating parameters and data to server, which in turn, sends the information to the camera. In an alternative scenario, the user can enter this information via an application program executing on his PC, or PDA, and then instruct the application to download the information to the camera via a direct wire or wireless connection to the camera.

Image Data Sources

The data associated with images in the camera may come from a variety of sources. One source of data is the camera UI. Another source is the internal components and peripherals of the camera, such as a time clock, GPS device, camera components, camera software, etc. Yet another source is an external device. In this case, the camera will either have the data in its memory, after receiving it from the external source, or the camera will have a reference to data, which is stored on external device. As detailed further below, the reference may be an pointer, address or some other form of identifier that is encoded in the image.

Storage of Data Types and Data Items Associated with Images

A related design issue is where to store the data associated with an image at various stages of image processing. These stages include: 1) before configuring the camera; 2) after configuring, but before snapping the picture; 3) after snapping, but before transferring the associated image from the camera; and 4) after transferring the image from the camera.

Before Configuring the Camera

Before configuring the camera, the data types and data items to be associated with images may be stored in the camera or in one or more external storage devices, depending on the application.

The camera may maintain data types and items within the memory subsystem built into the camera (e.g., ROM or RAM) or within removable memory devices, such as a floppy disk, flash memory card etc. In some implementations, the camera maintains a set of data types that a user, application program or device may select to associate with images. A user can select from among these desired data types from the user interface of the camera or from an external device.

In applications for external configuration, a user, device or application program may maintain this data in memory of a computer, such as personal computer, personal digital assistant, server on the Internet, etc.

After Configuring the Camera

After configuring the camera, selected data types and items to be associated with images may be stored in camera memory, or in external storage. In either case, the camera maintains an association between the images to be captured and the data to be associated with those images. In cases where the image metadata is stored externally, the camera maintains a reference to the external data, such as an identifier number, pointer, or address.

After Capturing A Target Image

After capturing a target image in the camera, the camera may store data items associated with the image in the image itself through steganographic encoding, in the image file, outside the image file but within camera memory, and in external storage. The "target" image refers to the image that is associated with selected data types and data items. In the last two cases, the camera maintains a reference between the target image and the associated data. The reference may be encoded in the image steganographically or in the image file.

After Transferring the Image from the Camera

After transferring the image from the camera, the options for storing the data associated with the target image remain the same, yet the camera or some external device or process may transfer the data from one location to another. For example, an external steganographic encoder can embed some of the data in the image. In addition, an external process or device can transfer data to or from the image metadata in the image file. Image data stored externally may be transferred from one database, e.g., a configuration database, to another database, e.g., an image library or metadata database. For example, upon uploading an image to an image database, the uploading process can signal the configuration database to transfer image related data to the image or metadata database.

Associating Image Data with Images

The previous sections highlighted several methods for associating data with images. These methods include: steganographic encoding data in the image, storing the data within the image file (outside the image), storing the data outside the file and associating this external data with a reference stored in the file or encoded in the image. The following sections describe examples of these methods in more detail.

Embedding Auxiliary Data within an Image Using Steganographic Methods

The art of hiding auxiliary data into still and moving images is relatively advanced. Most techniques make slight changes to the image—e.g., by changing data representing the image, whether in the form of DCT coefficients, wavelet coefficients, pixel values, or other interchangeable representation—to thereby encode the auxiliary information. The changes are so slight as to be essentially imperceptible to the human visual system. Exemplary watermarking techniques are shown in U.S. Pat. No. 5,841,886 to Rhoads and U.S. Pat. No. 5,915,027 to Cox.

For additional information about a digital watermarking form of steganographic embedding and reading, see U.S. Pat. Nos. 6,614,914 and 6,122,403, which are incorporated by reference. The above references describe how to embed auxiliary information steganographically in various media objects, including still image, video and audio signals.

The steganographic encoder may be located within the camera or in external process or device. In either case, the encoder can be implemented in software, hardware or a combination of both.

An encoder implementation in the camera operates on images stored in the camera's memory system. For each image, the encoder converts auxiliary data to be embedded in the image into watermark signal and combines the watermark signal with the image. This auxiliary data may include one or more references, a machine instruction or set of instructions, and other data items about the image. A reference is a data item, such as identifier number, address or pointer. It may be used to identify the image and reference additional data related to it.

The camera-based encoder obtains auxiliary data to be embedded in an image from memory, or some other device in the camera. Recall that during configuration of the metadata, the user or some external device or process specifies the data types and data items to be associated with images. At encoding time, the encoder retrieves data designated for embedding in the image, converts it into a watermark signal and combines it with the associated image. To reduce the amount of data embedded in the image, the encoder may embed one or more references that identify data associated with the image that is stored outside the image.

There are many places to implement the encoder outside the camera. In one implementation, the encoder is implemented as part of a process for uploading the image from the camera. In this implementation, the data for embedding in the image may come from the camera, an external device, or a combination of both. During the configuration stage, a configuration process specifies that data to be associated with image, including any data to be embedded in the image. As explained above, this data may be stored on the camera or an external device. The uploading process transfers the images from the camera, along with any data associated with the images.

As part of the uploading process, an encoder then encodes auxiliary data designated for embedding in the image into the image. As in the camera-based process, this auxiliary data may include one or more references that associates the image with other auxiliary data stored outside the image. This type of reference avoids the need to transfer metadata into the camera. Rather than transfer such data into the camera, metadata may be configured and maintained on an external device, and referenced to the image via a reference encoded into a watermark in the image. Conversely, the uploading process may move data associated with an image from the camera, store it in a metadata database, and reference the entry in the database via a reference encoded in the watermark.

Embedding Auxiliary Data in the Image File

The camera, or an external process, may also embed auxiliary data in the image file, but outside the image. To support this type of association, the image is stored in a file format that allows metadata to be stored in the file along with metadata. For example, the format may specify that the data is to be stored in the file header. This approach of associating data with an image has advantages, but is more susceptible to intentional or unintentional manipulation.

In this case, a reference embedded in the image can be used to correlate the image with the correct metadata. This is particularly useful in applications where the metadata is placed in the image file by a process external to the camera. In these cases, it is possible that the metadata may be improperly assigned to a particular image. In addition, various image processing applications may remove or alter the image metadata stored in the image file. The data steganographically embedded in the image can be used to authenticate the metadata stored in the image file. One form of authentication is to match a reference number embedded in the image with a reference number in the image file metadata. More sophisticated forms of authentication may be implemented as well.

For example, both the number in the file metadata and the watermark may be encrypted. Also, the number may be a digital signature derived from the image, such as by performing a hash function on the image sample values. The digital signature has the added advantage that it can be used to determine whether the image has been modified. For additional security, the digital signature can be encrypted, and then embedded in the watermark and placed in the image file metadata.

Maintaining Auxiliary Data Separate from the Associated Image

As noted above, the auxiliary data associated with the image can be maintained separately from the image. A reference to this external, auxiliary data may be embedded in the image (e.g., in a watermark), in the image file metadata, or both.

Data Types

The types of data that can be associated with an image are numerous and vary with the application. The image data framework described above supports a variety of different data types, including:

- who took the picture (the photographer,
- who or what is the subject of the picture,
- where was the picture taken (e.g., entered by user, or provided by GPS device),
- when was the picture taken (e.g., date and time of day), how was the picture taken, including camera specifications such as brand, model, manufacturer, and type of color converter, lens, sensor, flash, etc.
- picture specific device data, including shutter speed, flash used, camera settings, focus, distance of subject from camera, resolution of image, light levels,
- why was the picture taken? entertainment, legal record, medical record, real estate, business transaction record, etc.
- image type,
- copyright conditions,
- copyright owner and owner of copy,
- view data—the camera location and subject location,
- comment—e.g., user comment picture identifiers, e.g., industry or application specific identifiers,
- collection data, including collection ID, collection caption, collection members,
- Image quality parameters,
- Color profile,
- Image integrity—Digital signature, encryption key (e.g., public encryption key),
- Sound annotation, or reference to sound annotation,
- Language specifier, for elements of the metadata,
- view region—Advanced Photo System Print Aspect Ratio (PAR) selections of conventional, HDTV, and panoramic,
- user address, e.g., email or physical address,
- reference to derivative work—parent image and its derivatives,
- reference to alternative images—e.g., alternative view, color space, resolution, etc.
- region specification—describe a region in a picture, e.g., the pixels that represent an object in the picture,
- compression format of image, compression format of image data (e.g., compression format of image metadata),
- encryption type of the image, and the image data (encryption of image metadata),
- references to other information (e.g., pointers, network links or addresses, phone numbers, etc.)
- machine instructions or sets of instruction, e.g., instructions that control rendering of the image, that disable or enable certain types of editing operations, that control compression, decompression operations, etc.

Metadata Applications that Exploit Steganographic Data

Steganographic encoding of data enhances existing applications of image metadata and enables a variety of novel applications. The following sections describe some of these applications.

Persistent Steganographic Data and Metadata Servers

Steganographic encoding of auxiliary data in an image enables persistent linking of the image to its metadata. Metadata that is stored within an image file, yet outside the image, is vulnerable to intentional and unintentional manipulation. Whenever an application or device processes the image, it may remove or alter the associated metadata. One solution is to store the metadata separately from the image. However, this approach requires that there be a reliable way to link the metadata to the image as it passes from one image processing application or device to the next. Steganographic encoding provides such a link between the image and its metadata. This link is referred to as a persistent staganographic link because it remains part of the image data through various image processing operations, including transfer to and from the analog domain (e.g., printing to image capture).

Figure 3:
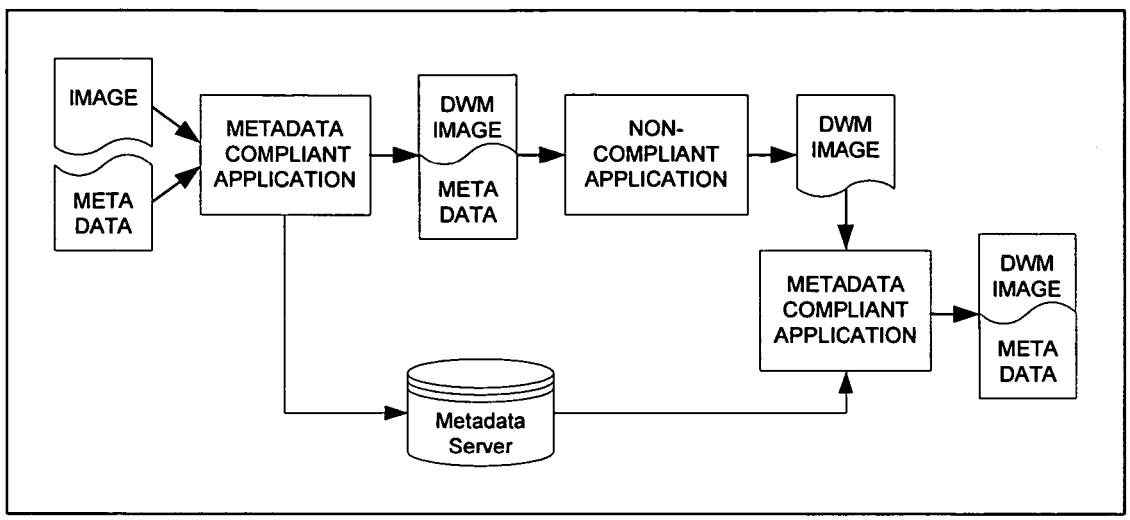
FIG. 3 is a diagram illustrating an application of steganographic links to metadata in images.

FIG. 3 is a diagram illustrating a metadata server application that uses a persistent steganographic link to ensure that various devices and applications that process an image have access to its metadata. This diagram refers to "compliant" and "non-compliant" metadata applications. A compliant application refers to a device or software process that adheres to standard guidelines for maintaining image file metadata. A non-compliant application is a device or process that does not adhere to such guidelines, and may alter the metadata in unintended ways.

Starting from the upper left of FIG. 3, a compliant application adds metadata to the image, and sends the metadata to a metadata server. The server stores the metadata along with a reference (e.g., unique number) to the image. This reference serves as a link to the image, and matches the reference steganographically embedded in the application. This example scenario assumes that the form of steganographic coding is a digital watermark. Either the compliant application, or some other previous process embeds the watermark, including the reference, in the image.

The compliant application produces an image file that includes the digital watermarked image (DWM) and the metadata. One example of such an application is the application for uploading images from cameras or from PCs to a server on the Internet. This application embeds the watermark in the image and forwards the metadata to the metadata server. Note that the server application for uploading images and the metadata server database application may be implemented in the same server or a group of servers.

Next, a non-compliant application gets this file, and removes or corrupts the metadata, leaving only the watermarked image.

Noticing that the image does not have metadata, the next compliant application sends a request to the metadata server for the image's metadata. The compliant application, equipped with a watermark detector, screens the image and extracts the reference to the image's metadata. It then forwards this reference to the metadata server, which returns the metadata. The format of the metadata may be based on XML or some other standard or custom data format. Preferably, the metadata format is sufficiently general to be compatible with many different devices and applications, but this not a requirement. The compliant application produces a new image file, including the watermarked image and its restored metadata.

Metadata Router

Figure 4:
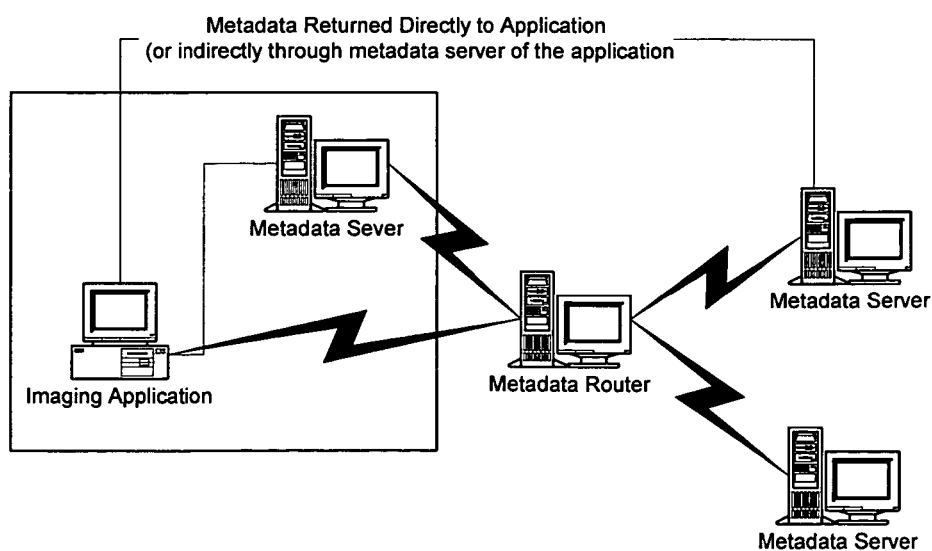
FIG. 4 is a diagram illustrating the use of steganographic links to access metadata from different imaging systems.
Figure 1:
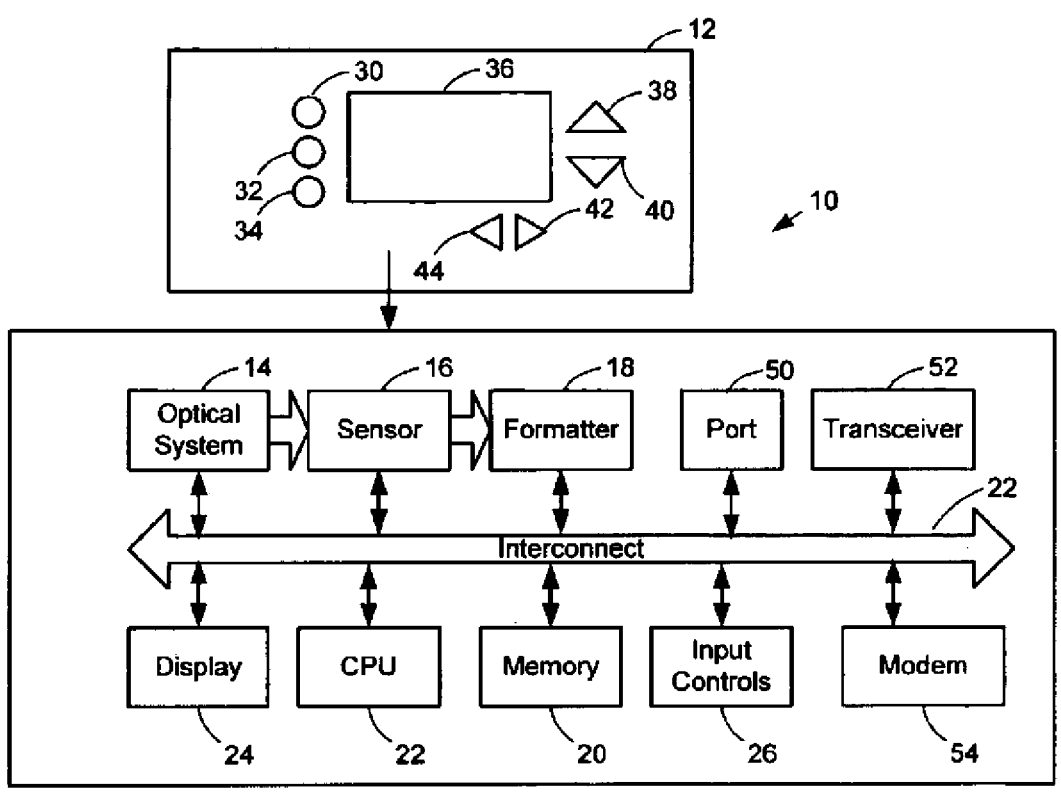
Figure 3:
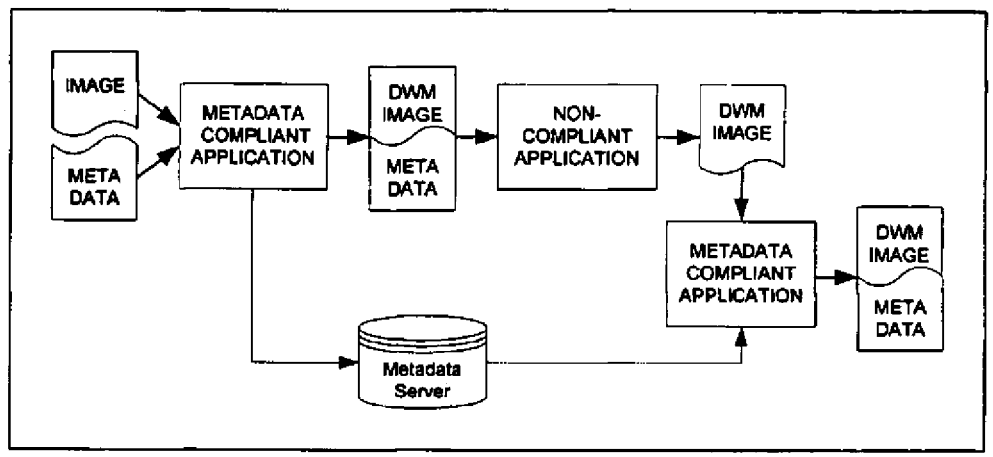
Figure 4:
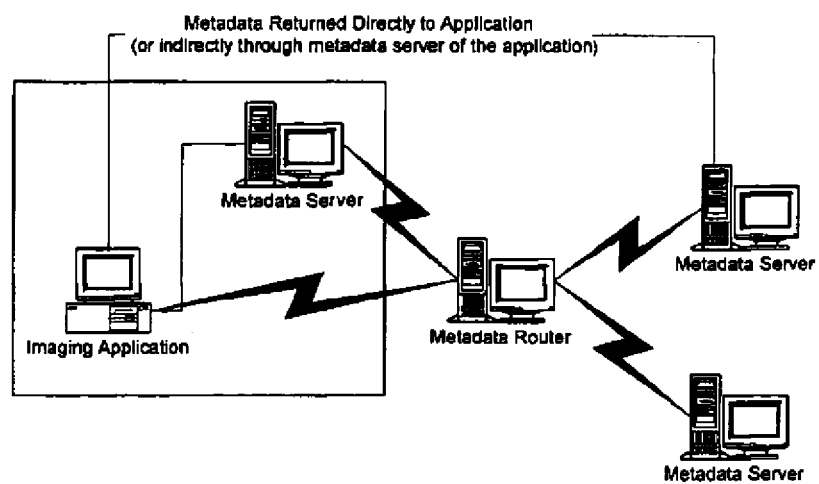

This concept can be extended beyond a single system by adding another component, the metadata router. Assume a collection of different systems, each with its own metadata server, and each tracking its own images. FIG. 4 depicts an example of three different systems, each having its own metadata server. Each of the metadata servers handles requests from imaging applications within its system. If an image from one system is acquired by another system, the new system will not have any associated metadata. Therefore, any application in the new system that tries to retrieve metadata from its metadata server will fail; it will find no information. If however, the new metadata server can determine which metadata server does have the information, it can request the image metadata from the other metadata server.

The metadata router is the component that can help resolve which metadata server contains information about a particular image. The metadata router can operate either on a watermarked image, or a reference extracted from an image. In the former case, the requesting system has been unable to detect the metadata reference (e.g., it cannot detect a watermark), and thus, has forwarded the image to the router. The router then performs one or more watermark detection operations to extract the reference, and if successful, maps the extracted reference to the metadata server by using the extracted reference as a key to the metadata server in its database.

In the latter case, the requesting system has extracted the metadata reference, but does not maintain the metadata for that reference. The metadata router maps the reference to the appropriate metadata server by using the reference as a key to the metadata server in its database. It then redirects the request to the metadata server, which returns the requested metadata. The server having the metadata may return the metadata to the metadata server of the system from which the request originated and/or to the requesting application. This system may be implemented on a computer network, such as the Internet, using conventional networking protocols to communicate requests and return data over the network.

The application may also make the request for metadata by requesting the metadata from the metadata router. The router, using the identifying information extracted from the watermark, redirects the request to the appropriate metadata server. The server maps the reference to the image's metadata and returns the requested metadata to the metadata server of the system from which the request originated and/or to the requesting application.

Searching Metadata

The techniques described above provide powerful applications for searching metadata that extend across different imaging applications and systems. For example, a user of an imaging application in one system can send a search request to the metadata server for that system. The search request can direct a search in one more fields of the metadata (e.g., time, place, subject, etc.) in the metadata database. Using the metadata router, the metadata server can extend the search across systems by forwarding the search request to a metadata router, which in turn, forwards the requests to other metadata servers.

In addition, applications can support image based searching. For example, an end user might find an image of interest. The user then issues a request such as: "find other images like this one" (e.g., taken at a similar time, in a similar place, or having a similar subject). The client application or the metadata server extracts the reference from the image watermark. The metadata server then searches its database for images that are similar based on the criteria provided by the user, or based on metadata associated with the image. The metadata server can extend the search to other metadata servers by forwarding the request to other metadata servers via the metadata router. If the user finds an image that is not compatible with the system he is using, the same approach outlined above for finding the image's metadata can be used to find the corresponding metadata server and initiate a database search for related images.

Access to Just Metadata (Independent of the Picture)

The schemes outlined above facilitate access to metadata independent of the picture. By storing the metadata in a metadata database, applications can access, search and transfer the metadata without the images. This is particularly beneficial where bandwidth and storage is limited because the most common form of metadata, text, is usually smaller in size than the associated image. It requires less bandwidth and memory to transmit and store this text separately from its associated image.

Metadata of an image may also be voluminous in some cases. For example, the metadata may include a sound or video annotation. It is advantageous to be able to store, access and search this type of metadata separately.

Metadata Editing (Create, Read, Update, and Delete)

The metadata server scheme outlined above support editing of the metadata associated with an image. To edit an image's metadata, a user may access the metadata by extracting the persistent link to the metadata server and issuing a request to the metadata server. The metadata server implements a scheme for managing the rights to edit (e.g., create, read, update, and delete) the image's metadata. For example, the server may require the user to enter authentication information, such as user name and password. In response, the server determines the editing rights by looking them up in its database. Based on these rights, the user may be granted the authority to create, read, update, or delete the metadata.

Metadata Persistence

Persistent steganographic links to metadata ensure the persistence of an image's metadata through various operations, including file conversion (e.g., changing the file format of the image), file transmission (e.g., sending an image by email, or by wireless transmission), image compression, and image editing. The steganographic data is designed to stay in tact through various forms of image processing.

The persistence of the steganographic link also ensures metadata persistence of various types of data associated with the image, including copyright information. In addition, it supports adding multiple instances of copyright information, for works with multiple owners, and authors. The scheme for managing editing rights described above enables authors who create new works based on existing works to add copyright information to the image. The metadata server may be programmed to notify the copyright owner whenever another author wishes to modify an image. The right to modify a particular image may be pre-specified (e.g., a specified list of authors who have editing rights), or may be requested on a case by case basis. The metadata server may notify the copyright owner by email, for example, asking for authorization to grant editing rights to a particular author. If granted, the metadata server informs the new author of the terms. Then, if the new author excepts the terms by sending a return email or manifesting intent via an interactive web page, for example, the metadata server allows the new author to create a derivative work of the image.

The derivative work inherits the metadata of the original work, including copyright information of the copyright owner in the original work. To associate the metadata for the new image, the metadata server provides a new reference to the new author's imaging application, which in turn, steganographically encodes the new reference in the derivative work. Additionally, the metadata server adds an entry in its database that associates the reference embedded in the new work with its corresponding metadata. This entry may also include a pointer to the database entry for the original work. This scheme for cross referencing earlier works enables the metadata server as well as system users and applications to track the history of an image through various types of editing.

Steganographic linking of images to metadata allows the persistence of an image's metadata to be specified externally by a user, device or application. As noted above, the persistence of metadata is often vulnerable to intentional and unintentional manipulation. It is difficult for a user to specify which items of metadata are to persist with the image, and under which circumstances.

The metadata server allows users, devices and application processes to specify which items of metadata are to remain persistent, through various forms of processing. The metadata servers and routers, having the appropriate authority, may annotate an image's entry or entries in a metadata database to specify which data items will survive specified types of image processing, or image transfers. For example, if one system requests a metadata server to supply metadata to another system via the metadata router, the metadata server will only supply metadata that is designated to be persistent for the specified type of operation on the image.

The steganographic link to metadata also supports the combination of metadata when two or more images are combined. As noted above, the metadata server may issue a new reference to be steganographically encoded in the new, combined image. The server may combine the metadata by combining the metadata for each component image into one metadata database entry, by inserting reference links in the database entry for the new image to the metadata entries for the component images, or some combination of these approaches.

Metadata Format and Processing

The metadata may be specified using the standard Extensible Markup Language, XML, or some other standard or custom format. The XML standard describes a class of data objects called XML documents and partially describes the behavior of computer programs which process them. XML is an application profile or restricted form of SGML, the Standard Generalized Markup Language [ISO 8879]. By construction, XML documents are conforming SGML documents. XML documents are made up of storage units called entities, which contain either parsed or unparsed data. Parsed data is made up of characters, some of which form character data, and some of which form markup. Markup encodes a description of the document's storage layout and logical structure. XML provides a mechanism to impose constraints on the storage layout and logical structure.

A software module called an XML processor is used to read XML documents and provide access to their content and structure. In the implementations based on XML, the XML processor processes raw XML data on behalf of other application programs, such as an image processing application or a metadata server application. For more information on XML and XML processors, see the XML Standard document, Version 1.0, by the World Wide Web Consortium.

Metadata Security and Authentication

The metadata associated with an image may be secured and authenticated at various stages of processing. These processing stages include: at or shortly after image capture in the camera, upon uploading the image from the camera, within the metadata server, and during transfers of the metadata from one device, application or system to another. One way to secure the metadata is to encrypt it. Another way is to restrict access to it via the metadata server such that only authenticated users, applications, and devices have access to it. Yet another way is to create a digital signature of the metadata, such as by performing a secret hash function on the data to derive a unique signature. This signature can be recomputed for suspect metadata and compared with a signature stored in the metadata database or elsewhere to determine whether the metadata has been modified.

Other Applications

With the growth in popularity of digital image capture devices, there is a growing demand for photo processing and storage services for digital images. Several companies now offer photo-processing services accessible via the Internet. These services create prints of digital photos sent via the Internet and mail the prints to the customer. A related service is providing an on-line database of images. Such services enable customers to maintain a collection of photos in an accessible database, e.g., an on-line database on the Internet.

The metadata database applications described above provide an effective way to manage data associated with images. These applications are particularly applicable to the Internet, where the database information may be made available to a variety of users, imaging devices, application processes and systems.

The image metadata may be maintained in a separate database or in a database integrated with an image database that stores the images themselves. The image database may contain a private collection of photos or collections of photos from unrelated users.

A related application to maintaining image and metadata databases is tracking transactions involving the images or their metadata. The image or metadata database may keep a history or log file of the transactions associated with an image. For example, as users request processing services on photos, such as creating prints, putting the prints on objects (e.g., shirts, cups, calendars, posters etc.), etc., a tracking application keeps a record of the transaction, listing attributes of the transaction like the date, vendor, service provided, and images subject to the service. The transaction history may then be linked with other metadata and the image itself by a reference, such as the steganographic link embedded in the image. There are a variety of other ways to link the transaction history with an image. For example, the transaction history may be stored in an entry in the metadata or image database associated with the image.

These applications may also be implemented for other media signals, such as audio, video, graphical models, etc. as explained below.

Other Media Types

The technology described above relating to persistent links in images also applies to other media signals, including audio, and video signals, and computer graphics models (e.g., two-dimensional, three-dimensional graphical models and animation). Video is just another form of an image signal, so the same technology applies to embedding, reading and using links and metadata steganographically encoded into video signals. Steganographic processes may also be applied to audio signals as described in the patent documents incorporated by reference in this document. As such, the same applications may be implemented for audio by embedding metadata and/or a persistent link to metadata in an audio signal.

Much of the technology discussed above directly pertains to still image capture devices as well as video capture devices, so no further elaboration is required. Generally speaking, metadata or a persistent link to metadata may be steganographically encoded into a video signal at the time of capture or at some later time and location. A video capture device may be adapted to insert a steganographic link in one or more video frames as the video signal is being captured, or shortly thereafter, before the encoded signal is transferred from the device. Also, the steganographic link may be inserted in the video signal as it is being transferred to an external device, such as a computer either directly linked or indirectly linked through a communication network (e.g., the Internet).

Similarly, metadata or a persistent link to metadata may be steganographically encoded into an audio signal at the time of capture or at some later time and location. An audio capture device (e.g., an analog or digital audio recording device) may be adapted to insert a steganographic link in one or more audio segments as the audio signal is being captured, or shortly thereafter, before the encoded signal is transferred from the device. Also, the steganographic link may be inserted in the audio signal as it is being transferred to an external device, such as a computer either directly linked or indirectly linked through a communication network (e.g., the Internet).

Once inserted in the media signal, a decoder can then extract the metadata or persistent link to metadata from the media signal. Once a steganographic decoder extracts the link to metadata or metadata itself, the same applications described above for retrieving, processing and using metadata apply. For example, the metadata server and router systems may be adapted to store and control access to metadata for media signals other than images. The same metadata applications that exploit steganographic data for images apply to other media signals as well.

Appendix A: Metadata and Digital Watermarking

By combining the DIG35 metadata standard, digital watermarking, and asset management technologies, the flexibility, persistence and accuracy of image metadata can be enhanced.

Overview

Low cost digital cameras and scanners, film to CD processing, and photo sharing web-sites are all helping fuel an explosive growth in digital imaging; a growth that both creates new opportunities for digital imaging and that brings with it new management problems. Whether you are a home enthusiast or a professional in the imaging industry, dealing with the sheer number of digital images is becoming a major problem. Fortunately, digital images, unlike their paper counterparts, can be part of the solution to the management problem.

By combining the digital image with other data about that image—i.e. image owner, location where the image was taken, and date and time when the image was taken—we can develop applications and processes to manage the flood of digital images. Such additional information is referred to as metadata, or data about data. Digital images allow data to be embedded directly into an image, giving them a distinct advantage over paper images. Some tools such as Asset Management Systems and Workflow Applications try to address the management issues involved with digital imaging. These tools store metadata; in some form and in some location. But these systems are proprietary and do not enable the metadata gathered about an image in one device or application to be used in another device or application. In order to create devices, applications and processes that effectively and efficiently use metadata, they must all agree on the form of the metadata.

The Digital Imaging Group's (DIG) DIG35 Initiative, building upon the XML (extensible Markup Language) standard, specifies the syntax and semantics of one such imaging metadata standard. This standard will enable different imaging devices, applications and processes to seamlessly work together. Additional work is being done by the <indecs> project and the DOI Initiative to extend this interoperability beyond the imaging industry. By defining metadata frameworks and object identification, an infrastructure can be defined that will enable unprecedented levels of sharing and management of intellectual property. The remainder of this paper will focus on the DIG35 Initiative and the image industry, but by extension, can be applied to other industries as well.

While the DIG35 metadata standard provides a foundation for future development, real world issues cause problems with deployment today. Non-compliant image formats, imaging applications and devices, all contribute to weakening the reliability of imaging metadata. Either through unintentional, unavoidable or malicious usage, image metadata can be lost or altered. Additionally, there are situations where it may not be advantageous or proper to store the metadata with the image itself. One solution to these situations is to store the metadata in a separate repository, a metadata server, and store a unique link within the image that references back to the separately stored metadata.

The remaining problem with this solution is that the link within the image cannot itself be metadata. That is, the link needs to be part of the image, and not any extraneous information. (As we saw above, any extraneous information can be lost or modified.) Digital watermarking solves this problem by embedding a digital watermark directly into the image. Such a watermark uniquely identifies each image, and hence, provides the needed reference back to the metadata.

DIG35 Metadata Standard

The vision for the DIG35 Initiative Group is to "provide a standardized mechanism which allows end-users to see digital image use as being equally as easy, as convenient and as flexible as the traditional photographic methods while enabling additional benefits that are possible only with a digital format."

The DIG35 Initiative Group has chosen to employ the W3C's Extensible Markup Language (XML) as the recommended mechanism to provide image metadata. The reasons for choosing XML include:

adoption in Internet enabled applications;
cross-platform nature;
extensibility;
device and operating system independence; and,
human and machine readable format.

The DIG35 Initiative Group then layers image metadata semantics on the XML underpinnings. This enables different image related applications (i.e. workflow, asset management, image capture) to effectively work together.

For example, consider an insurance company that processes auto accident claims; claims that include images. These images may be acquired by digital cameras or scanners. As the claim (with images) goes through the claims approval process, these images may be modified by a number of different image editing applications on a number of different computing platforms. And throughout, the claims processing application will be manipulating the image metadata. In order to use the same metadata from the beginning of the claims approval process to the end, each device and application in the process must understand the format and meaning of the metadata.

XML provides the means for understanding the format of the metadata, so it allows each application to read the metadata. But, it does not address the meaning, or semantics, of the metadata. For example, the digital camera may add date and time information about when the image was taken, the claims processing application may add date and time information about when the claim was processed, and the image editing application may add date and time information about when the image was edited. Without a standard that specifies the meaning of each, information may be lost or corrupted. The DIG35 Initiative supplies the needed meaning to the metadata.

Vulnerability of Metadata

As valuable as this image metadata is, it is also extremely vulnerable. First, DIG35 compliant image metadata relies on new and evolving image formats. Until such time as all imaging applications, processes and devices are upgraded to support the latest image formats in a sympathetic manner, DIG35 metadata is vulnerable to accidental deletion or to unavoidable loss. Such vulnerabilities include:

Workflows where an image is converted to a non-DIG35 compliant image format and hence, loses the image metadata;

Imaging applications that don't preserve metadata during image manipulation (see FIG. 3); and, Converting a digital image to a non-digital format and subsequently, back to a digital format (e.g., printing out an image and then scanning it back in).

Preparing an image for the WWW where file size and download time need to be minimized.

Let's return to our example of the auto insurance company. Digital images are taken by the insurance agents and incorporated into the claim. A claims adjuster then processes this claim. Finally, a claims manager approves the claim. During this processing, the image may be moved from one computer platform to another (from a PC to a Unix Server to a Macintosh). For various reasons, the image may change from one format to another as it progresses from one computer to another (BMP to TIFF to JPEG). During each of these format changes, metadata may be lost if each image converter and each image format is not DIG35 compliant. The image may also be altered to facilitate its processing by adjusting its size or by converting to grayscale. During each of these alterations, metadata may again be lost if the image processing application is not DIG35 compliant. Finally, if the final claim is printed or faxed, all of the image metadata will be lost.

The second image metadata vulnerability is malicious deletion or modification of the image metadata. By its nature, XML is stored as plain text. This makes it very easy to either change or delete the embedded image metadata. (Of particular note is the vulnerability of copyright information. With traditional film, one could assert a copyright by possession of the negative. However, with digital photography, there is no negative and hence, copyright enforcement requires new tools and techniques.)

Digital watermarking helps address both of these types of vulnerabilities. By uniquely identifying each image, a link can be established and maintained between the image and its metadata. This enables tracking and asset management of images and interoperability between DIG35 devices and applications even when the embedded metadata has been lost or changed.

Persistent Digital Watermarks and Metadata Servers

Since a digital watermark is embedded into the image data itself, the watermark cannot easily be changed or deleted without degrading the digital image. This enables a persistent link between image and metadata. By utilizing digital watermarks that uniquely identify images and storing DIG35 image metadata in a separate metadata server, an image can always be identified and its image metadata retrieved, even when using non-DIG35 compliant applications or image formats.

Continuing with our earlier example of auto insurance claims processing. When the image is first acquired, it is digitally watermarked and the metadata is copied to a metadata server. The image is originally saved in TIFF format on an IBM compatible PC. To support an Intranet based application, the image is subsequently converted to JPG and stored on a UNIX Web Server. In doing so, the embedded metadata is lost. Now, even though the image has been processed and the embedded metadata has been lost, users can still retrieve the associated metadata data from the metadata server by using the digital watermark found in the image itself.

This concept can be extended beyond a single system by adding another component, the metadata router. The metadata router is used by an application to route a request for metadata to a remote metadata server. Assume a collection of different and distributed systems, each with its own metadata server. An application can request metadata about any image, without knowing which metadata server has that metadata. The application makes this request by requesting the data from the metadata router. The router, using the identifying information in the watermark, can redirect the request to the appropriate metadata server.

Finishing with our friendly auto insurance company, let's assume that there are a number of branch offices. Branch Office A begins a processes a claim, and storing all the image metadata on the local metadata server. Later, Branch Office B needs to do some additional work on the claim. During processing, they have occasion to need to access the metadata about a particular image. The application makes a request to the metadata router, where the router redirects the request to the metadata server at Branch Office A. The server there returns the requested metadata.

Summary of Appendix A

While the rapid advances in digital imaging are opening up wonderful new possibilities for using digital images, it is imperative that we utilize new tools in the management and control of these digital images. The DIG35 Initiative provides a roadmap for future developments surrounding metadata enhanced digital imaging.

To be useful, the metadata must be reliable. Today, with non-compliant applications and devices, the metadata cannot easily be integrated into existing processes, if at all. Additionally, due to file size or confidentiality concerns, it may not be desirable or proper to embed metadata directly into the image itself. By combining the DIG35 Metadata Standard, digital watermarking and metadata servers, it is possible to greatly increase the reliability and usability of image metadata.

Further, by utilizing a metadata router, the reach of the metadata system is greatly increased. In addition to knowing metadata about images within its own system, the metadata server can discover information about images from other systems.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above. Additional information is provided above in Appendix A, entitled "Appendix A: Metadata and Digital Watermarking".

The particular combinations of elements and features in the above-detailed embodiments are exemplary only; the interchanging and substitution of these teachings with other teachings in this and the incorporated-by-reference patents/applications are also contemplated.

I claim:

1. A computer-implemented method comprising:
   extracting a steganographic reference to auxiliary data embedded in a media signal, wherein a media file comprises the media signal and metadata;
   computing a first hash value based upon the media signal;
   determining the metadata does not include a value matching the computed first hash;
   querying, based in part on determining the auxiliary data does not include a value matching the computed first hash, a metadata database to request the auxiliary data associated with the media file using the extracted reference to access the auxiliary data in the metadata database;
   receiving the auxiliary data from the database; and
   adding the auxiliary data from the database to the media file as the metadata, wherein the auxiliary data comprises the first hash value.

2. The method of claim 1 further comprising:
   providing the media file that includes the auxiliary data.

3. The method of claim 1 further comprising:
   sending authentication data to the metadata database to request access to the auxiliary data associated with the media file.

4. The method of claim 1 further comprising:
   sending a request to the metadata database to edit the auxiliary data associated with the media file.

5. The method of claim 1, wherein the media signal comprises a second steganographic reference, wherein the second steganographic reference is an original hash value computed based upon an original media signal.

6. The method of claim 5, further comprising:
   determining if the media signal is different than the original media signal by determining if the first hash value is different than the original hash value.

7. The method of claim 1, further comprising encrypting the first hash value.

8. A non-transitory computer-readable storage medium on which is stored instructions, which when executed by a computing device, perform operations comprising:
   extracting a steganographic reference to auxiliary data embedded in a media signal, wherein a media file comprises the media signal and metadata;
   computing a first hash value based upon the media signal;
   determining the metadata does not include a value matching the computed first hash;
   querying, based in part on determining the auxiliary data does not include a value matching the computed first hash in a media file, a metadata database to request the auxiliary data associated with the media file using the extracted reference to access the auxiliary data in the metadata database;
   receiving the auxiliary data from the database; and
   adding the auxiliary data from the database to the file header of the media file as the metadata, wherein the auxiliary data comprises the first hash value.

9. The non-transitory computer-readable medium of claim 8, wherein the operations further comprise providing the media file that includes the auxiliary data.

10. The non-transitory computer-readable medium of claim 8, wherein the operations further comprise sending authentication data to the metadata database to request access to the auxiliary data associated with the media file.

11. The non-transitory computer-readable medium of claim 8, wherein the operations further comprise sending a request to the metadata database to edit the auxiliary data associated with the media file.

12. The non-transitory computer-readable medium of claim 8, wherein the media signal comprises a second steganographic reference, wherein the second steganographic reference is an original hash value computed based upon an original media signal.

13. The non-transitory computer-readable medium of claim 8, wherein the operations further comprise:
   determining if the media signal is different than the original media signal by determining if the first hash value is different than the original hash value.

14. The non-transitory computer-readable medium of claim 8, wherein the operations further comprise encrypting the first hash value.

* * * * *

UNITED STATES PATENT AND TRADEMARK OFFICE
CERTIFICATE OF CORRECTION

PATENT NO. : 8,429,205 B2
APPLICATION NO. : 11/198892
DATED : April 23, 2013
INVENTOR(S) : Rhoads It is certified that error appears in the above-identified patent and that said Letters Patent is hereby corrected as shown below:

On the Title Page

Page 2, in Item (63), under "Related U.S. Application Data", in Column 1, Line 1, delete "(is" and insert -- is --, therefor.

Page 4, in Item (56), under "OTHER PUBLICATIONS", in Column 1, Line 44, delete "M1005" and insert -- M1005, --, therefor.

Page 4, in Item (56), under "OTHER PUBLICATIONS", in Column 1, Line 49, delete "Vo." and insert -- Vol. --, therefor.

Page 4, in Item (56), under "OTHER PUBLICATIONS", in Column 2, Line 7, delete "Rhoades." and insert -- Rhoads. --, therefor.

Page 4, in Item (56), under "OTHER PUBLICATIONS", in Column 2, Line 39, delete "Paten" and insert -- Patent --, therefor.

In the Drawings

Delete drawing sheet 1 of 3 and substitute the attached drawing sheet 1 of 3 therefor.

Delete drawing sheet 3 of 3 and substitute the attached drawing sheet 3 of 3 therefor.

In the Specification

In Column 1, Lines 9-10, delete "U,S. Pat. No. 7,010.144)," and insert -- U.S. Pat. No. 7,010,144), --, therefor.

Signed and Sealed this
Eleventh Day of March, 2014

Michelle K. Lee
*Deputy Director of the United States Patent and Trademark Office*

CERTIFICATE OF CORRECTION (continued)
U.S. Pat. No. 8,429,205 B2

In Column 2, Line 52, delete "Internet" and insert -- Internet, --, therefor.

In Column 3, Line 44, delete "stegranographic" and insert -- steganographic --, therefor.

In Column 11, Line 14, delete "photographer," and insert -- photographer), --, therefor.

In Column 12, Line 13, delete "staganographic" and insert -- steganographic --, therefor.

In Column 14, Line 37, delete "in tact" and insert -- intact --, therefor.

In Column 14, Line 55, delete "excepts" and insert -- accepts --, therefor.

In Column 17, Line 59, delete "(extensible" and insert -- (eXtensible --, therefor.

UNITED STATES PATENT AND TRADEMARK OFFICE
CERTIFICATE OF CORRECTION

Page 1 of 1

PATENT NO. : 8,429,205 B2
APPLICATION NO. : 11/198892
DATED : April 23, 2013
INVENTOR(S) : Geoffrey B. Rhoads It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1,509 days.

Signed and Sealed this
Ninth Day of December, 2014

Michelle K. Lee
*Deputy Director of the United States Patent and Trademark Office*